ated astolic pressure and systolic pressure, for accurately

United States Patent

Link

[11] 3,903,872
[45] Sept. 9, 1975

[54] APPARATUS AND PROCESS FOR PRODUCING SPHYGMOMETRIC INFORMATION

[75] Inventor: William T. Link, Berkeley, Calif.

[73] Assignee: American Optical Corporation, Southbridge, Mass.

[22] Filed: Feb. 25, 1974

[21] Appl. No.: 445,559

[52] U.S. Cl.... 128/2.05 A; 128/2.05 G; 128/2.05 M
[51] Int. Cl............................................. A61b 5/02
[58] Field of Search.... 128/2.05 G, 2.05 A, 2.05 M, 128/2.05 N, 2.05 Q, 2.05 Z

[56] References Cited
UNITED STATES PATENTS

| | | | |
|---|---|---|---|
| 2,865,365 | 12/1958 | Newland et al. | 128/2.05 A |
| 3,101,032 | 8/1963 | Steen et al. | 128/2.05 M |
| 3,450,131 | 6/1969 | Vogt | 128/2.05 A |
| 3,565,057 | 2/1971 | Hart | 128/2.05 Z |
| 3,581,734 | 6/1971 | Croslin | 128/2.05 M |
| 3,598,112 | 8/1971 | Figar | 128/2.05 A |
| 3,714,939 | 2/1973 | Day et al. | 128/2.05 A |
| 3,814,083 | 6/1974 | Fletcher et al. | 128/2.05 A |

OTHER PUBLICATIONS

Naylor, "Analog Preprocessor for use in monitoring arterial pressure", Bio-Med. Eng., Vol. 6, No. 2, Feb. 1971, pp. 77-80.
George et al., "Measurement of Max. Rate of Rise of Aortic Bl. Pressure in Men", Med. Res. Eng., 4th Qt., 1967, pp. 21-24.

Primary Examiner—Richard A. Gaudet
Assistant Examiner—Lee S. Cohen
Attorney, Agent, or Firm—Joel Wall; William C. Nealon; H. R. Berkenstock, Jr.

[57] ABSTRACT

The invention comprises an apparatus and a process for producing sphygmometric information. The pressure in a blood pressure cuff is detected by a pressure transducer. The pressure signal is then differentiated with respect to time into a representation of a time derivative thereof. The representation is a function of two variables, the pressure applied externally adjacent an artery and time within a blood pressure pulse. The time derivative can be a first derivative, a second derivative or a higher derivative. Comparison is then made at a chosen time within a pulse of the time derivative with different applied pressures. When the first derivative is a negative maximum as a function of applied pressure the corresponding applied pressure is representative of the actual pressure within the blood vessel undistorted by the applied pressure. The apparatus and process of the present invention are particularly useful for accurately and quickly determining diastolic pressure and systolic pressure, for accurately reproducing a pressure trace corresponding substantially to the undistorted blood pressure pulse within an artery, and for providing indication of a plurality of time derivatives and the corresponding applied pressures at a measurement time within a pulse, which indication is substantially proportional to a measurement of the compliance of the artery.

26 Claims, 7 Drawing Figures

APPARATUS AND PROCESS FOR PRODUCING SPHYGMOMETRIC INFORMATION

The prior art is replete with devices for measuring the blood pressure of a living subject. The simplest and oldest device is a pressurizable cuff used in combination with a mercury manometer which reads the pressure in the cuff and a stethoscope which is used to listen to Korotkoff sounds. More complicated methods and apparatus based on the same principle of listening to the Korotkoff sounds replace the mercury manometer with a mechanical or electromechanical pressure gauge and utilize microphonic detection of the Korotkoff sounds which are analyzed electrically. In another advanced method of measuring blood pressure the distance from a blood pressure cuff to the wall of an artery is accurately determined as by measuring Doppler shifts of sound waves reflected by the artery. The distance to the artery, of course, varies as a function of pressure within the somewhat pliable walls of the artery. In addition, intrusive devices are often inserted directly into blood vessels to make blood pressure measurements.

The methods based on listening to Korotkoff sounds are inherently somewhat inaccurate for measuring diastolic pressure since the human or electromechanical listening must distinguish when a sound fades out. The method based on Doppler shifts is sensitive to the positioning of the measuring apparatus relative to the artery. The intrusive methods are somewhat painful and require the attention of a trained medical technician. Also, of the above methods only the intrusive technique can provide a representation of the true pulsatile blood pressure-time relationship within a blood vessel independent of externally applied pressure.

The apparatus and process of the present invention are based upon measurements related to the time dependent pulsatile pressure within a blood vessel. Blood pressure is accurately and quickly measured by the process and apparatus of the present invention. A representation of the substantially true pulsatile blood pressure-time relationship within a blood vessel is also obtainable. Further, data substantially proportional to the compliance curve of the blood vessel is obtainable.

An apparatus and a process for producing the above and other information which relates to the physical condition of a living subject is disclosed in the following.

SUMMARY OF THE INVENTION

The apparatus and process are based upon the discovery that if pressure applied by a cuff adjacent a blood vessel is plotted against a time derivative of the observed cuff pressure evaluated at a specific time in a pulse (on the blood pressure wave form), when the applied cuff pressure is approximately equal to the undistorted arterial pressure at that specific time within the blood pressure wave form of the test subject, the time derivative goes through a (negative) maximum value.

The invention comprises an apparatus for producing information indicative of the physical condition of a living test subject comprising means for converting a quantity proportional to a sum comprising a time dependent fluctuating component representative of the pulsatile pressure within a blood vessel plus a differable (selectively changeable) pressure applied externally adjacent the blood vessel into a representation of a time derivative of the quantity and means for electronically analyzing changes in the representation of the time derivative induced by differing (selectively changing) the applied pressure to produce an output indicative of the physical condition of a living test subject. A convenient means for accomplishing the analyzing comprises a means for substantially maximizing the time derivative as a function of the applied pressure at a measurement time within a pulse.

In a preferred embodiment of the invention the output comprises a readout indicative of the applied pressure corresponding substantially to a maximum value of the first time derivative. Thereby the output is representative of the substantially undistorted blood pressure at a time within a pulse. Preferably, the measurement time is determined relative to a reference time within the pulse, the reference time being the time when the first time derivative changes sign from negative to positive and the blood pressure is substantially equal to the diastolic pressure of the blood vessel. This allows valid comparisons to be made of a blood pressure value at a time relative to the reference time in one pulse with a blood pressure at the same relative time in another pulse. Also, preferably the measurement time is adjacent the reference time and the first time derivative is negative, whereby the output is to a close approximation equal to the diastolic pressure of the blood vessel.

In another preferred embodiment of the invention the output is indicative of a plurality of measurement times and the corresponding applied pressures when the time derivative of the quantity is substantially maximized for each of the plurality of measurement times whereby a representation of the substantially undistorted blood pressure-time relationship within a blood vessel is obtained.

In yet another preferred embodiment the output is indicative of a plurality of first time derivatives and the corresponding applied pressures at the measurement time whereby a representation of the compliance of the blood vessel is obtained.

In still another preferred embodiment of the invention the output comprises a value indicative of the applied pressure corresponding substantially to a maximum of the second time derivative. This embodiment is particularly useful when the pressure being measured is the systolic pressure of the blood vessel.

The invention further comprises a process for producing information indicative of the physical condition of a living test subject. The process comprising converting a quantity proportional to a sum comprising a time dependent fluctuating component representative of the pulsatile pressure within a blood vessel plus a differable (selectively changeable) pressure applied externally adjacent the blood vessel into a representation of a time derivative of the quantity and electronically analyzing changes in the representation of the time derivative induced by selectively changing the applied pressure to produce an output indicative of the physical condition of a living test subject. A convenient analyzing technique comprises substantially maximizing the time derivative as a function of the applied pressure at a measurement time within the pulse.

In a preferred embodiment of the invention the output comprises a value of the applied pressure corresponding substantially to the maximum time derivative. Thereby the output is representative of the substantially undistorted blood pressure at a time within a pulse. Preferably, the measurement time is determined relative to a reference time within the pulse, the reference time being the time when the first time derivative changes sign from negative to positive and the pressure is substantially equal to the diastolic pressure of the blood vessel. This allows valid comparisons to be made of a blood pressure value at a time relative to the reference time in one pulse with a blood pressure at the same relative time in another pulse. Also, preferably the measurement time is adjacent the reference time and the first time derivative is negative whereby the applied pressure is to a close approximation equal to the diastolic pressure of the blood vessel.

In another preferred embodiment the process includes providing an output indicative of a plurality of measurement times and the corresponding applied pressures when the time derivative of the quantity is substantially maximized for each of the plurality of measurement times whereby a representation of the substantially undistored blood pressure-time relationship within a blood vessel is obtained.

In yet another preferred embodiment the process includes providing an output indicative of a plurality of first time derivatives and the corresponding applied pressure at the measurement time whereby a representation of the compliance of the blood vessel is obtained.

In still another preferred embodiment the process includes providing an output indicative of the applied pressure corresponding substantially to a maximum of the second time derivative. This embodiment is particularly useful when the pressure being measured is the systolic pressure of the blood vessel.

BRIEF DESCRIPTION OF THE PREFERRED EMBODIMENTS

The invention will be better understood by reference to the drawings wherein like numbers denote like parts throughout and wherein FIG. 1 illustrates in overall block form the process of the present invention;

DETAILED DESCRIPTION OF THE PREFERRED EMBODIMENTS

It is to be understood that when reference is made herein to "maximizing" a quantity this does not necessarily mean maximization of its positive value. The term maximizing is thus used broadly to include maximizing the negative value or the positive value of a quantity. When the quantity being maximized is the first time derivative a negative maximum is meant in particular.

Figure 1:
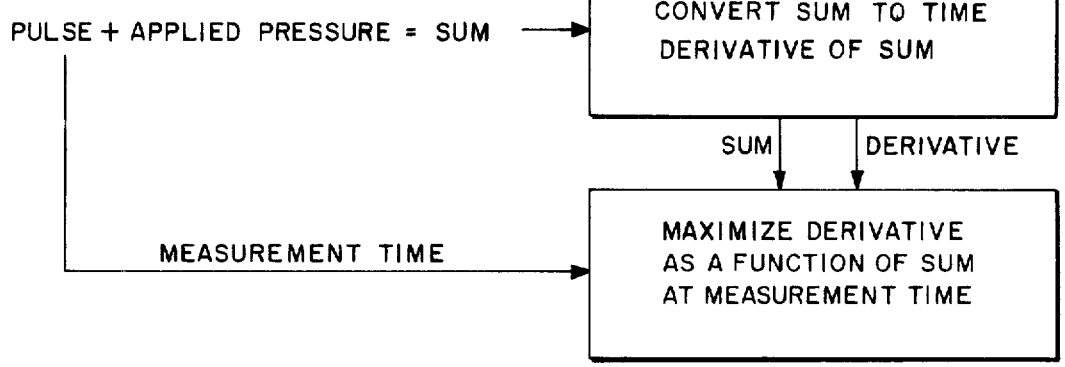
Figure 2:
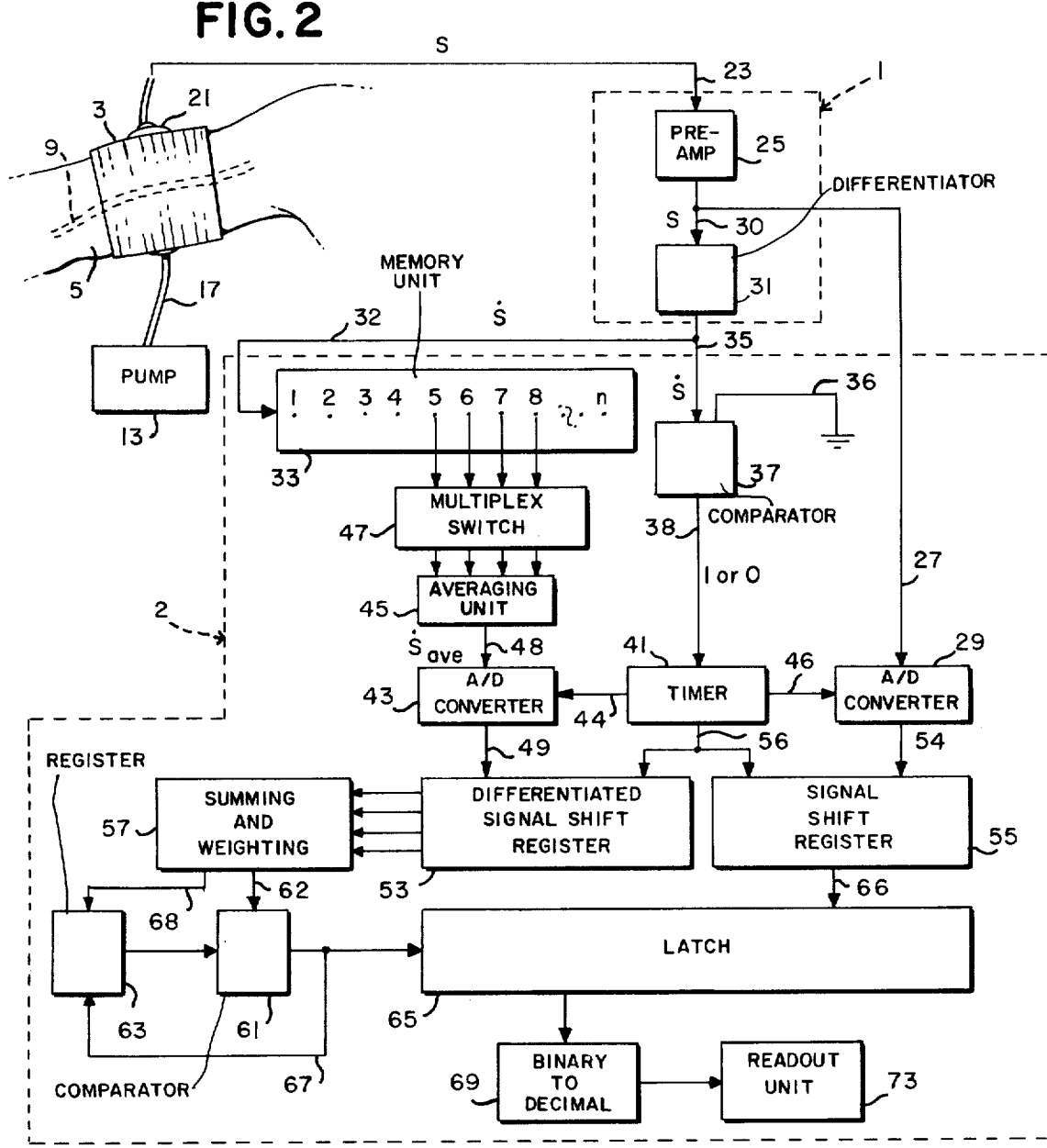
FIG. 2 is a block diagram illustrating the apparatus and process of the present invention in combination with blood pressure measuring equipment.

Referring now to the figures, and in particular to FIGS. 1 and 2, the preferred embodiments of the invention can be better understood.

As will be perhaps most apparent from FIG. 1 a quantity proportional to the sum of a time dependent fluctuating component (designated "PULSE") representative of the pulsatile pressure within a blood vessel plus a differable pressure applied externally adjacent the blood vessel (designated "APPLIED PRESSURE") is converted into a representation of a time derivative of the quantity. Changes induced in the representation of the time derivative are electronically analyzed in this case by being substantially maximized as a function of the APPLIED PRESSURE at a measurement time (designated "MEASUREMENT TIME") within the pulse to produce an output indicative of the physical condition of the test subject.

Referring to FIG. 2 a means 1 is illustrated for converting the quantity proportional to said sum into said representation of a time derivative. Also illustrated is a means 2 for electronically analyzing changes in the representation of the time derivative induced by differing the applied pressure. In FIG. 2 the means 2 more specifically comprises a means for substantially maximizing said time derivative as a function of applied pressure at a measurement time within a pulse.

Referring more particularly to the details of FIG. 2, means for applying a differable pressure adjacent a blood vessel, said pressure applying means comprising a blood pressure measuring means, in particular a cuff 3 is shown in position about an arm 5 containing an artery 9 therein. The cuff 3 can be a typical blood pressure cuff such as those utilized when one is making use of a stethoscope to hear Korotkoff sounds. Also a part of said pressure applying means along with the cuff is the pump 13, which can be a simple rubber bulb or can be a powered pump, acting through the tubing 17. The pressure resulting in the cuff is the sum of the pressure supplied by the pump and a pulsating pressure due to the time dependent pulsatile pressure surges within the artery. The cuff pressure is measured by the pressure transducer 21 or by other convenient means.

The output of the pressure transducer 21 comprises a sum signal S, the signal being representative of the pressure in the cuff, which is converted by the converting means 1 into a time derivative. In the embodiment illustrated in FIG. 2, the signal after passage from the converting means 1 to the maximizing means 2 represented as being via line 23 is preamplified at preamplifier 25 and then introduced as represented by line 27 to an analog-digital converter 29 the use of which is described later. The signal also passes as represented by line 30 to differentiator 31 where the signal is differentiated to form a differentiated signal, e.g., a first time derivative Ṡ. As a practical matter, the differentiator 31 also serves to filter out the applied pressure portion of the pressure measured by the transducer 21 whereby the resulting first time derivative, Ṡ, is substantially the first time derivative of the pulsating pressure representative of the time dependent pulsatile pressure surges within the artery. In cases where such filtering out may not occur, the derivative signal will generally vary by substantially a constant since the applied pressure will usually be applied in a generally linear ramp fashion whereby the applied pressure will equal an initial applied pressure "$P_o$" multiplied by $(1-At)$ where "A" is a constant, for a downramped applied pressure and by $P_o$, At for an upramped applied pressure. The time derivative of the applied pressure is, thus, generally simply $\pm A\, P_o$. The differentiated signal is then fed as represented by line 32 into memory unit 33. The memory unit can be a typical so-called bucket brigade analog memory the operation of which is described in more detail in following. The differentiated signal is also fed as represented by line 35 into comparator 37.

The output of comparator 37 is set to a level representative of unity if the differentiated signal, $\dot{S}$, is greater than zero, and to a level representative of zero if the differentiated signal is less than or equal to zero. To accomplish this the differentiated signal is compared with a reference ground represented by line 36. The output from the comparator passes as represented by line 38 to timer 41. When the value being supplied by the comparator to the timer is 1, memory unit 33 is ordered by analog to digital converter 43 which is controlled by the timer as represented by line 44 to load one or more values of the differentiated signal into signal averaging unit 45.

The precise value or values of the differentiated signal to be loaded are determined in the preferred embodiment by the setting of multiplex switch 47. The multiplex switch serves to allow selection of what portion of the memory unit is to be sampled and is not fully necessary to operation of the apparatus. The signal averaging unit is likewise not fully necessary but is useful for producing an average value of the differentiated signal rather than a value from a particular location in the memory unit.

Memory unit 33 in the embodiment illustrated in FIG. 2 stores values of the differentiated signal, $\dot{S}$, at multiples of, e.g. 10 milliseconds, i.e., at $n - - - 80, 70, 60, 50, 40, 30, 20$ and 10 and 0 milliseconds before the differentiated signal changes sign from negative to positive which is equivalent to before the output being supplied by comparator 37 to timer 41 becomes representative of unity. Physically the change in sign of the differentiated signal corresponds to the change in direction from dropping to rising of the time dependent pulsatile blood pressure which occurs at the so-called diastolic pressure of the test subject. Thus, through use of the comparator a reference time is defined within each pulse as being substantially equal to that time at which the pressure pulse reaches substantially diastolic pressure.

An average value of the differentiated signal, $\dot{S}$, for a selected time on the time dependent fluctuating pulsatile blood pressure curve is obtained by feeding the outputs at desired moments in time before the diastolic pressure point from the memory unit 33 via multiplex switch 47 into the signal averaging unit 45. If outputs 5, 6, 7 and 8 of memory unit 33 provide access to values representative of the differentiated signal at 50, 60, 70 and 80 milliseconds prior to the time of occurrence of diastolic pressure of the test subject, then the signal averaging unit provides as an output a value representative of the average differentiated signal, $\dot{S}_{ave}$, at approximately 65 milliseconds prior to diastolic pressure. Since the time dependent fluctuating pulsatile blood pressure is changing slowly in this region and a curve representative of the blood pressure time relationship is substantially linear in this region, the applied pressure corresponding to the average differentiated signal being a maximum is to a close approximation equal to diastolic pressure.

The output from signal averaging unit 45 is passed as represented by line 48 to analog to digital converter 43. The signal, S, data converted by previously mentioned analog to digital converter 29 and the average differentiated signal, $\dot{S}_{ave}$, data converted by analog to digital converter 43 are synchronized to convert simultaneously with one another by signals supplied by timer 41 to each of the analog to digital converters as represented by lines 46 and 44 respectively. The average differentiated signal data, in digital form is passed from analog to digital converter 43 as represented by line 49 to differentiated signal shift register 53. Similarly the signal data in digital form is passed as represented by line 54 from analog to digital converter 29 to the signal shift register 55. The timer further supplies a timing signal as represented by line 56 to the differentiated signal and to the signal shift registers to instruct the registers when to load from the analog to digital converters.

Successive portions of the $\dot{S}$ content of the differentiated signal shift register 53 are summed and weighted by summing and weighting unit 57 according to an appropriate algorithm and then presented to digital comparator 61 as represented by line 62. For example, four successive average differentiated signal, $\dot{S}_{ave}$, values can be averaged by the summing and weighting unit. The summing and weighting unit delays the summed and weighted output and then passes it on to the comparator 61. In the comparator 61, successive weighted sums are compared and when the later sum has a desired value relative to the earlier sum, e.g., when it is greater than the earlier sum, latch 65 is ordered by the comparator 61 to load S data from a selected position of the signal shift register 55 as represented by line 66, e.g., to load the pressure signal, S, which corresponds to the average differentiated signal being a maximum and register 63 is ordered by the comparator 61 as represented by line 67 to load the output of unit 57 represented by line 68. The signal is fed out of the signal shift register 55 into the latch and is thereafter converted from binary to binary coded decimal by binary-decimal converter 69 and is displayed by readout unit 73.

Figure 3:
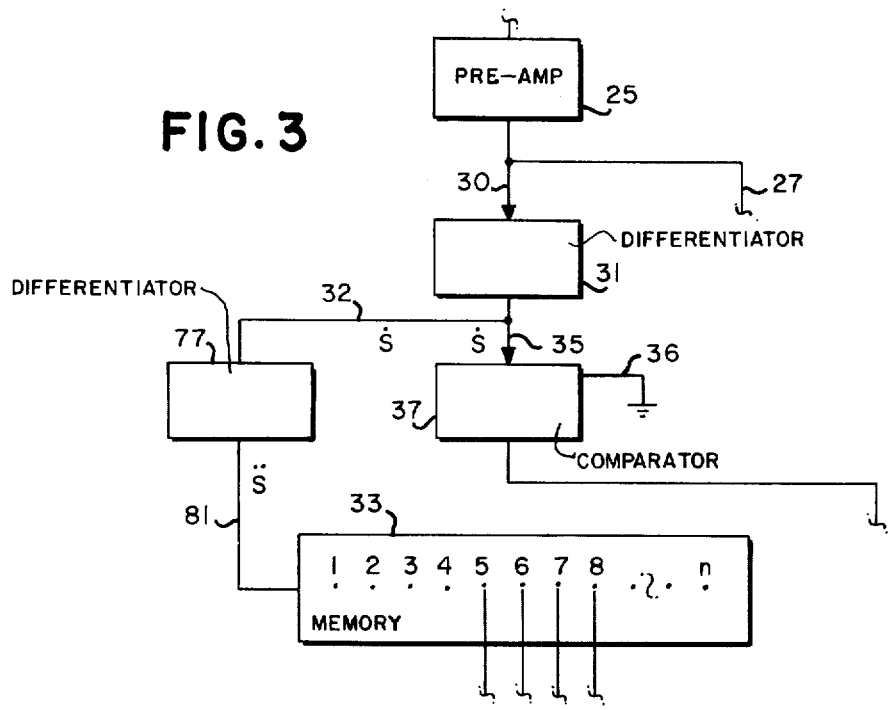
FIG. 3 illustrates an embodiment of the invention wherein the second time derivative of the cuff pressure is determined.

FIG. 3 illustrates an embodiment of the invention where it is desired to provide a second time derivative, the doubly differentiated signal, $\ddot{S}$. This is particularly useful in measuring systolic pressure, the plot of the doubly differentiated signal versus the signal, S, going through a relatively sharp maximum when the applied pressure approaches the systolic pressure of a test subject. This is an especially useful technique since the differentiated signal is always approximately zero in this region of the pulse and the plot of the signal versus the differentiated signal may show relatively little or no change.

In FIG. 3, a second differentiator 77 receives the differentiated signal from differentiator 31 as represented by line 32. The second differentiator converts the differentiated signal, $\dot{S}$, into the doubly differentiated signal $\ddot{S}$, and then passes the doubly differentiated signal as represented by line 81 to memory unit 33. In this embodiment of the invention it is clear that subsequent operations on the data stored in the memory unit proceeds exactly as in the previously described embodiment with the exception that the doubly differentiated signal replaces the differentiated signal throughout the remaining operations.

Figure 4:
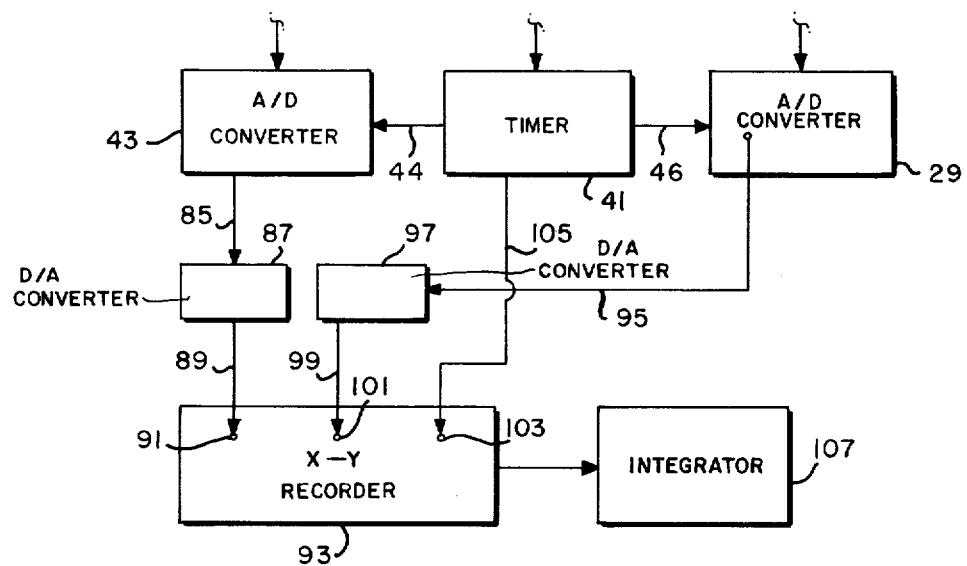
FIG. 4 illustrates an embodiment of the invention wherein an output indicative of a plurality of measurement times and the corresponding applied pressures when the first time derivative is maximized results.

FIG. 4 illustrates an embodiment of the invention wherein the information being produced relative to the physical condition of the test subject comprises the compliance of the artery of the test subject. In this embodiment a plot of the differentiated signal, $\dot{S}$, v. the signal, S, at a conveniently chosen time within a pulse is desired.

In FIG. 4, successive average differentiated signal, $\dot{S}_{av}$, values are passed as represented by line 85 to digital to analog converter 87 and thence as represented by line 89 to the X-axis drive input 91 of X-Y recorder 93. The signal, S, values which correspond to the average differentiated signal values are fed in a coordinated manner from the analog to digital converter 29 as represented by line 95 to digital to analog converter 97 and thence as represented by line 99 to the Y-axis drive input 101 of the X-Y recorder. The Z-axis drive input 103 of the X-Y recorder is fed timing signals from timer 41 as represented by line 105 whereby the pen of the recorder is ordered to touch the recorder paper for each timing signal. An integrator 107 is also illustrated whereby a curve proportional to a plot of arterial volume versus pressure at the artery wall can be obtained through integration of the differentiated signal versus signal curve. Again the components previously discussed with respect to FIG. 2 are present and serve their usual functions.

Figure 5:
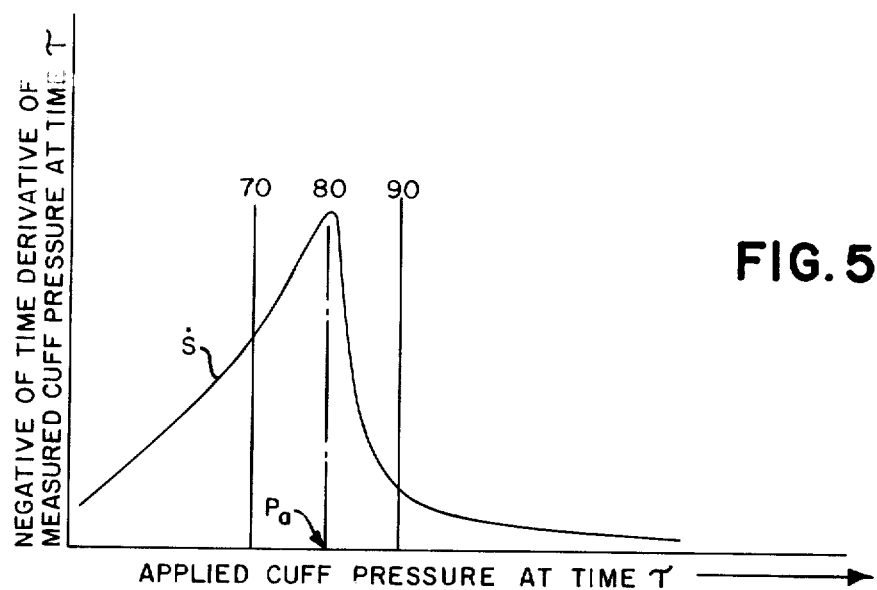
FIG. 5 illustrates the variation in the first time derivative at a time, $\tau$, within a pulse as a function of applied cuff pressure.

FIG. 5 illustrates the shape of the derivative signal, $\dot{S}$, curve and, in particular, illustrates the sharp break in this curve which occurs when the pressure applied adjacent the wall of the artery is substantially equal to the instantaneous pressure, P$\alpha$, during the pulse within the artery. The curve illustrated shows a negative maximum for the derivative signal as indeed occurs physically. Values of the differentiated signal for cuff pressures of 70, 80 and 90 mm of Hg are marked upon the curve. Any convenient time, $\tau$, within the pulse may be chosen for the measurement. It is only necessary to avoid times within the pulse when the derivative signal changes too fast or is zero, e.g., at the peak of systolic pressure, during the systolic rise or at the dicrotic notch.

Figure 6:
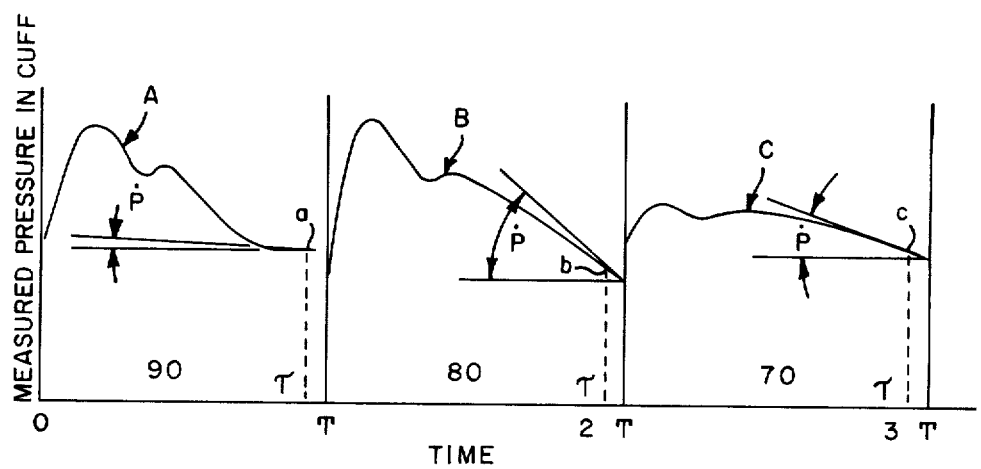
FIG. 6 illustrates the shapes of successive cuff pressure vs. time pulses as the measured cuff pressure changes from 90 mm of Hg to 80 mm of Hg to 70 mm of Hg.

FIG. 6 illustrates successive blood pressure pulses A, B and C and in particular illustrates the change in shapes of these curves adjacent the occurrence of diastolic pressure, namely at the points $a$, $b$ and $c$ (corresponding to the time $\tau$, $\tau$ being less than the period, T, of the pulse) when the applied pressure changes from much more than the diastolic pressure of the artery as at $a$, to equal to the diastolic pressure as at $b$, to less than the diastolic pressure as at $c$. Curve A corresponds to an applied pressure of 90 mm of Hg, curve B to 80 mm of Hg and curve C to 70 mm of Hg for an assumed diastolic pressure of 80 mm of Hg. The relatively large changes in the time derivative of the applied pressure, $\dot{P}$, as the applied pressure approaches the diastolic pressure of the test subject are illustrated graphically in FIG. 6.

Figure 7:
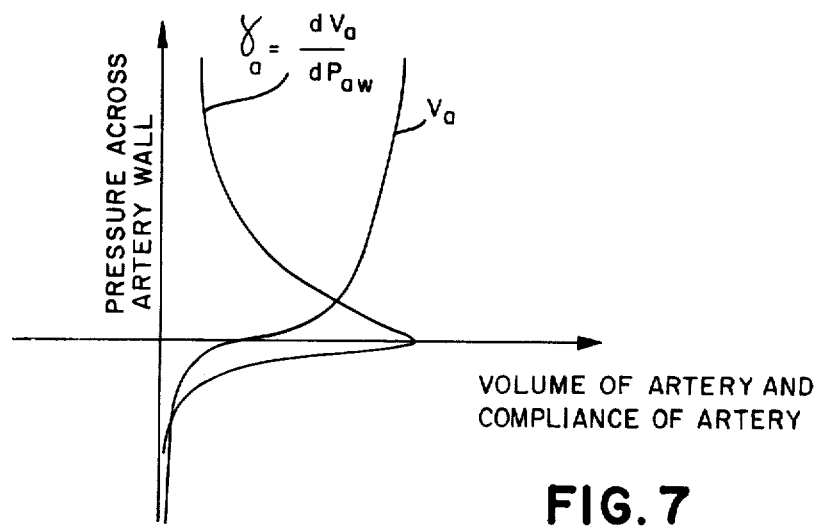
FIG. 7 illustrates the shapes of the arterial volume vs. pressure at artery wall and of the compliance curves for an artery.

FIG. 7 illustrates arterial volume, $V_a$, as a function of arterial wall pressure, $P_{aw}$, and also illustrates the arterial compliance, $\gamma a = dV_a/dP_{aw}$, as a function of arterial wall pressure. The sharp change in the value of arterial volume corresponds to the collapse of the artery, a positive value of arterial wall pressure indicating that $P_a$, the internal arterial pressure, exceeds the externally applied pressure. It is clear that the arterial compliance shows a maximum value, as a function of arterial wall pressure when the applied pressure is equal to the internal arterial pressure.

It should be noted that the arterial compliance curve shown in FIG. 7 and the derivative signal, $\dot{S}$, curve shown in FIG. 5 are proportional to one another; this becomes more readily apparent if one of these curves is rotated 90° so that their pressure axis correspond.

In the preceding description of the preferred embodiments of the invention the electronic techniques utilized comprise a combination of analog and digital operations. It is to be understood there are any number of equivalent techniques wherein components which are described above as being digital can be analog instead and vice versa.

While the invention has been described in connection with specific embodiments thereof, it will be understood that it is capable of further modifications, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. In an apparatus for producing information indicative of the physical condition of a living test subject, said apparatus including means for applying a selectively changeable pressure to the test subject adjacent a blood vessel and means for measuring a fluctuating quantity proportional to a sum, said sum comprising a time-dependent fluctuating component representative of the pulsatile pressure within the blood vessel, plus the selectively changeable pressure applied externally adjacent the blood vessel, the improvement comprising:

means for converting said quantity into an electronic representation of a time derivative of at least the fluctuating component thereof;
   means for analyzing changes in said electronic representation of said time derivative induced by changing the applied pressure; and
   means for producing an output from said analyzing means indicative of the physical condition of the living test subject 2. An apparatus for producing information indicative of the physical condition of a living test subject, comprising:

means for applying a selectively changeable pressure to the test subject externally adjacent a blood vessel;
   means for measuring a quantity proportional to a sum, said sum comprising:
   a. a time-dependent fluctuating component representative of the pulsatile pressure within the blood vessel, plus
   b. the changeable pressure applied externally adjacent the blood vessel;
   means for converting said quantity into a representation of a time-derivative thereof;
   means for substantially maximizing the time-derivative of at least the fluctuating component of the quantity as a function of the applied pressure at a measurement time within the pulse; and means for producing an output from said maximizing means indicative of the physical condition of the living test subject.

3. An apparatus as in claim 2, wherein the converting means comprises means for converting the quantity into a representation of a first time derivative thereof and the output producing means includes means for providing as said output a readout indicative of the applied pressure corresponding substantially to a maximum first derivative.

4. An apparatus as in claim 3 wherein the maximizing means includes means for selecting the measurement time relative to a reference time within the pulse, the reference time being the time when the first derivative changes sign from negative to positive and the blood pressure is substantially equal to the diastolic pressure of the blood vessel.

5. An apparatus as in claim 4 wherein the measurement time selecting means selects the measurement time to be adjacent to the reference time and the first derivative to be negative whereby the output is to a close approximation equal to the diastolic pressure of the blood vessel.

6. An apparatus as in claim 2 wherein the output producing means includes means for providing as said output a readout indicative of a plurality of measurement times and the corresponding applied pressures when the time derivative of the quantity is substantially maximized for each of the plurality of measurement times.

7. An apparatus as in claim 2 wherein the output producing means includes means for providing as said output a readout indicative of a plurality of time derivatives and the corresponding applied pressures at the measurement time.

8. An apparatus as in claim 2, wherein the converting means comprises means for converting the quantity into a representation of a second time derivative and the output producing means includes means for providing as said output a readout indicative of a value of the applied pressure corresponding substantially to the maximum second derivative.

9. A sphygmometric apparatus, comprising:
means for applying a selectively changeable pressure externally adjacent a blood vessel;
means in communication with said pressure applying means for measuring a quantity proportional to a sum, said sum comprising:
a. a time-dependent fluctuation component representative of the pulsatile pressure within the blood vessel, plus
b. the changeable pressure applied externally adjacent the blood vessel;
means for converting the quantity into a representation of a time-derivative thereof;
means for substantially maximizing the time derivative of at least the fluctuating component of the quantity as a function of the applied pressure at a measurement time within a pulse; and
means for producing an output from said maximizing means indicative of the physical condition of a living test subject.

10. An apparatus as in claim 9, wherein the pressure applying means includes a blood pressure cuff and the quantity measuring means comprises a pressure transducer in communication therewith.

11. An apparatus as in claim 10, wherein the converting means comprises a differentiator.

12. In a process for producing information indicative of the physical condition of a living test subject, including applying a selectively changeable pressure to the test subject externally adjacent a blood vessel and measuring a quantity proportional to a sum, said sum comprising time-dependent fluctuating component representative of the pulsatile pressure within the blood vessel, plus the changeable pressure applied externally adjacent the blood vessel, the improvement comprising:
A. converting said quantity into an electronic representation of a time derivative of at least the fluctuating component thereof;
B. electronically analyzing changes in said representation of said time derivative induced by differing said applied pressure; and
C. producing from said analyzing an output indicative of the physical condition of the living test subject.

13. A process for producing information indicative of the physical condition of a living test subject, comprising:
applying a selectively changeable pressure to the test subject externally adjacent a blood vessel:
measuring a quantity proportional to a sum, said sum comprising:
a. a time-dependent fluctuating component representative of the pulsatile pressure within the blood vessel, plus
b. the changeable pressure applied externally adjacent the blood vessel;
converting said quantity into an electronic representation of a time derivative thereof;
substantially maximizing the time derivative of at least the fluctuating component of the quantity as a function of the applied pressure at a measurement time within the pulse; and
producing an output from said maximizing indicative of the physical condition of the living test subject.

14. A process as in claim 13, wherein the quantity is converted into a representation of a first time derivative, and wherein the output produced is indicative of a value of the applied pressure corresponding substantially to the maximum first derivative.

15. A process as in claim 14 including determining the measurement time relative to a reference time within the pulse, the reference time being the time when the first derivative changes sign from negative to positive and the applied pressure is substantially equal to the diastolic pressure of the blood vessel.

16. A process as in claim 15 including selecting the measurement time to be adjacent the reference time and the first derivative to be negative, whereby the output is to a close approximation equal to the diastolic pressure of the blood vessel.

17. A process as in claim 13 wherein the output producing step provides an output indicative of a plurality of measurement times and the corresponding applied pressure when the time derivative of the quantity is substantially maximized for each of the plurality of measurement times.

18. A process as in claim 13 wherein the converting step converts the quantity into a representation of a first time derivative and the output producing step provides an output indicative of a plurality of first derivatives and the corresponding applied pressure at the measurement time.

19. A process as in claim 13, wherein the converting step converts the quantity into a representation of a second time derivative and the output-producing step provides an output indicative of a value of the applied pressure corresponding substantially to the maximum second derivative.

20. Apparatus for indicating the physical condition of a living test subject, comprising:
   a. means for applying a selectively changeable constricting pressure to a blood vessel of said subject;
   b. sensor means associated with said pressure applying means for producing an electrical signal which is a function of the sum of the applied pressure plus a representation of the pulsatile pressure fluctuations in said blood vessel;
   c. electronic processing means for calculating the time derivative of at least said representation of said pulsatile pressure portion of said signal, sampling said differentiated signal at a measurement time within a pulse and determining the applied pressure corresponding to substantially a maximum value of said differentiated signal at said measurement time; and
   d. means for producing an output from said electronic processing means indicative of the physical condition of said subject.

21. An apparatus for indirectly measuring the diastolic pressure of the blood in an artery of a mammal, comprising means engaging the body of the mammal external of the body and overlying an artery in the mammal, said engaging means including means for applying a changeable pressure to said artery to at least partially collapse same and transducer means for detecting pulsations representative of the pressure in the artery and providing an electrical output representing the wave form of the pressure of the blood in the artery due to the beating of the heart in the mammal with respect to time and including diastolic and systolic pressures, means differentiating the electrical output from the transducer means at least at times just prior to a rise from the diastolic pressure towards the systolic pressure to ascertain the slope of the wave form in this region during each heart beat, and means for ascertaining when the differentiated value becomes a maximum to provide the diastolic pressure.

22. An apparatus as in claim 21 wherein said means engaging the body is in the form of a cuff which surrounds the artery and wherein the transducer means measures the sum of the pressure applied by the means engaging the body plus the pulsatile pressure representative of the pressure in the artery.

23. A process for indicating the physical condition of a living test subject, comprising:
   a. applying a selectively changeable constricting pressure to a blood vessel of said subject;
   b. electronically sensing the sum of the applied pressure plus a representation of the pulsatile pressure fluctuations in said vessel to produce an electrical signal which is a function of said sum;
   c. electronically processing said signal to (1) produce a time derivative of at least said representation of said pulsatile pressure fluctuations portion of said signal, (2) sample said differentiated signal at a measurement time within a pulse and (3) determine the applied pressure corresponding to substantially a maximum value of said differentiated signal at said measurement time; and
   d. producing an output from said electronic processing indicative of the physical condition of said subject.

24. In a method for sensing the diastolic pressure in an artery of a mammal in which the blood pressure in the artery follows a wave form which includes a diastolic and systolic pressure for each heart beat, applying a changeable pressure to the body of the mammal external of the mammal and overlying an artery in the mammal which pressure is capable of at least partially collapsing the artery in the mammal, detecting pulsations in the blood pressure in the artery and providing an output with respect to time representing a wave form of the pressure of the blood in the artery due to the beating of the heart of the mammal and including diastolic and systolic pressures, ascertaining the slope of the wave form immediately prior to the systolic rise in the wave form for a plurality of heart beats by differentiating the output and ascertaining when said slope becomes the greatest to thereby ascertain the diastolic pressure.

25. A method as in claim 24 wherein the step of ascertaining where the slope becomes the greatest is obtained by ascertaining when the differentiated output becomes a negative maximum.

26. A method of determining diastolic blood pressure with the aid of a cuff adapted to apply a constricting pressure to a blood vessel, comprising the steps of applying pressure to the cuff, detecting the blood pressure at a point in the blood pressure pulse immediately prior to the onset of the systolic rise, differentiating said blood pressure at said point to form a first time derivative of the blood pressure at said point, maximizing said first time derivative as a function of said applied pressure and providing an output corresponding generally to a value of said applied pressure which corresponds to said first time derivative being a maximum.

* * * * *